Feb. 23, 1965  R. A. MILROY  3,170,483
QUIET FLOW REGULATOR VALVE
Filed Aug. 1, 1962  5 Sheets-Sheet 1
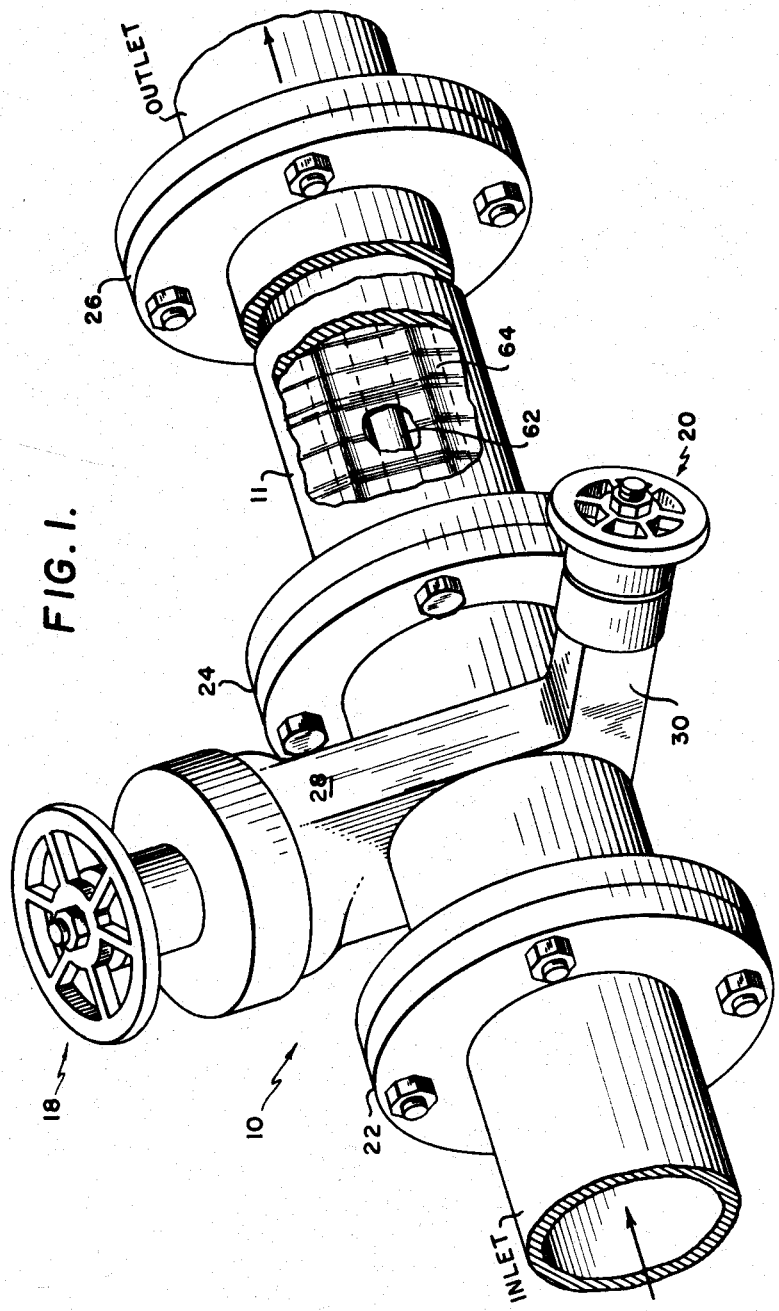
FIG. I.
INVENTOR
RICHARD A. MILROY
BY
ATTORNEY

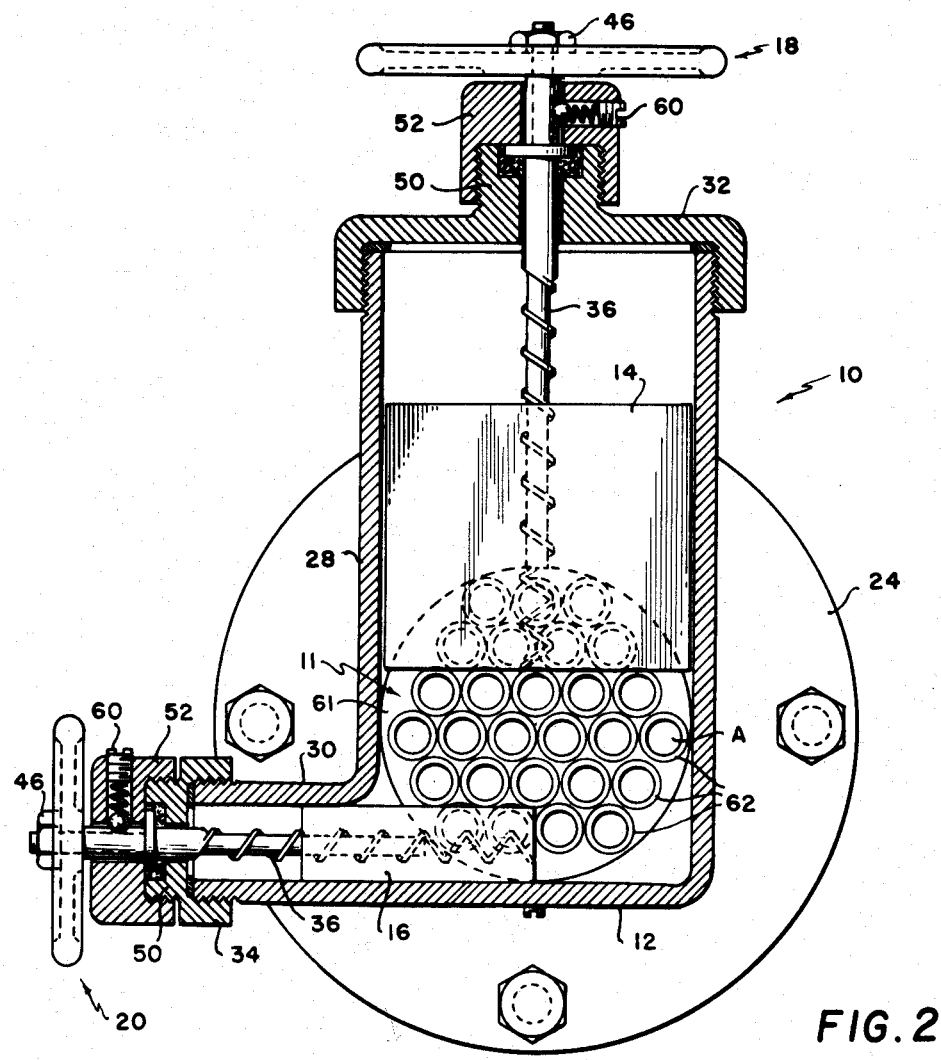

INVENTOR
RICHARD A. MILROY
BY
ATTORNEY

Feb. 23, 1965    R. A. MILROY    3,170,483
QUIET FLOW REGULATOR VALVE
Filed Aug. 1, 1962    5 Sheets-Sheet 5

INVENTOR
RICHARD A. MILROY

BY
*B. L. Zangwill*
ATTORNEY

# United States Patent Office 3,170,483
Patented Feb. 23, 1965

3,170,483
QUIET FLOW REGULATOR VALVE
Richard A. Milroy, 107 Best Gate Road, Annapolis, Md.
Filed Aug. 1, 1962, Ser. No. 214,149
3 Claims. (Cl. 137—553)
(Granted under Title 35, U.S. Code (1952), sec. 266)

The invention described herein may be manufactured and used by or for the Government of the United States of America for governmental purposes without the payment of any royalties thereon or therefor.

This invention relates to a quiet throttling means for a fluid flow; more particularly relates to a fluid flow throttling means or regulator for quietly regulating the flow of fluid in a pipe or the equivalent; and more specifically relates to a flow regulator comprising a valve means and a noise reducing or silencing means combined therewith.

An object of the invention is to provide an improved throttling means or regulator for lowering the pressure at a downstream point of a confined fluid flow. By throttling means is meant any device that regulates the quantity of fluid flow in a manner that reduces the pressure of the fluid flow on the upstream side of the device to a lower pressure on the downstream side.

Another object of the invention is to provide a flow regulator or throttling means that provides a simple but accurate control or regulation of the quantity of fluid flow therethrough, the regulator or throttling means being so constructed that the fluid flow is quiet.

The conventional method for regulating a fluid flow stream is by the placing of an obstruction or restriction in the stream. Examples of devices that provide such operation are nozzles, orifices, weirs, gate valves and other forms of valves. These devices have the disadvantage that structural-borne, fluid-borne and air-borne noises resulting from high fluid velocities are inherent in their operation.

In accordance with the invention, no part of the fluid passing through the throttling means or regulator is accelerated (positively or negatively) sufficiently to cause undesirable noise. To this end the total flow stream is divided into a plurality of paths or passages, each of which carries a smaller stream or sub-stream, and has sufficient fluid flow resistance loss to provide a pressure drop across the path that cannot cause any part of the sub-stream therethrough to obtain a velocity that would cause undesirable noise.

The plurality of paths is preferably obtained by many elements, such as tubes across the total area of the fluid stream thereat. Each element has enough flow resistance to accomplish its purpose of keeping the velocity of flow therethrough to a value that does not create significant noise. The dimensional proportions of each element can be determined by actual trial. A sufficient number of paralleled and properly proportioned elements should be used to obtain the required total flow. A preferred form of the invention contains an adjustable valve with such resistance elements juxtaposed thereto.

Among the advantages obtained with the invention are: it can be made inexpensively; it can be shaped to utilize spare space; it reduces and even eliminates surges and cavitation in the fluid therethrough; it provides accurate flow regulation; and it has improved noise-reduction characteristics.

Other objects and many of the attendant advantages of this invention will be readily appreciated as the same become better understood by reference to the following detailed description when considered in connection with the accompanying drawings wherein:

FIG. 1 is a longitudinal perspective view, except for parts broken away for clarity, of a portion of a pipe system for a confined fluid-stream, the system having incorporated therein a regulator embodying the invention, the regulator comprising a gate valve;

FIG. 2 is a transverse sectional view taken in a plane along the upstream side of the gate of the valve of FIG. 1;

FIG. 3 is an exploded view of a regulating member of the gate valve;

Figure 4:
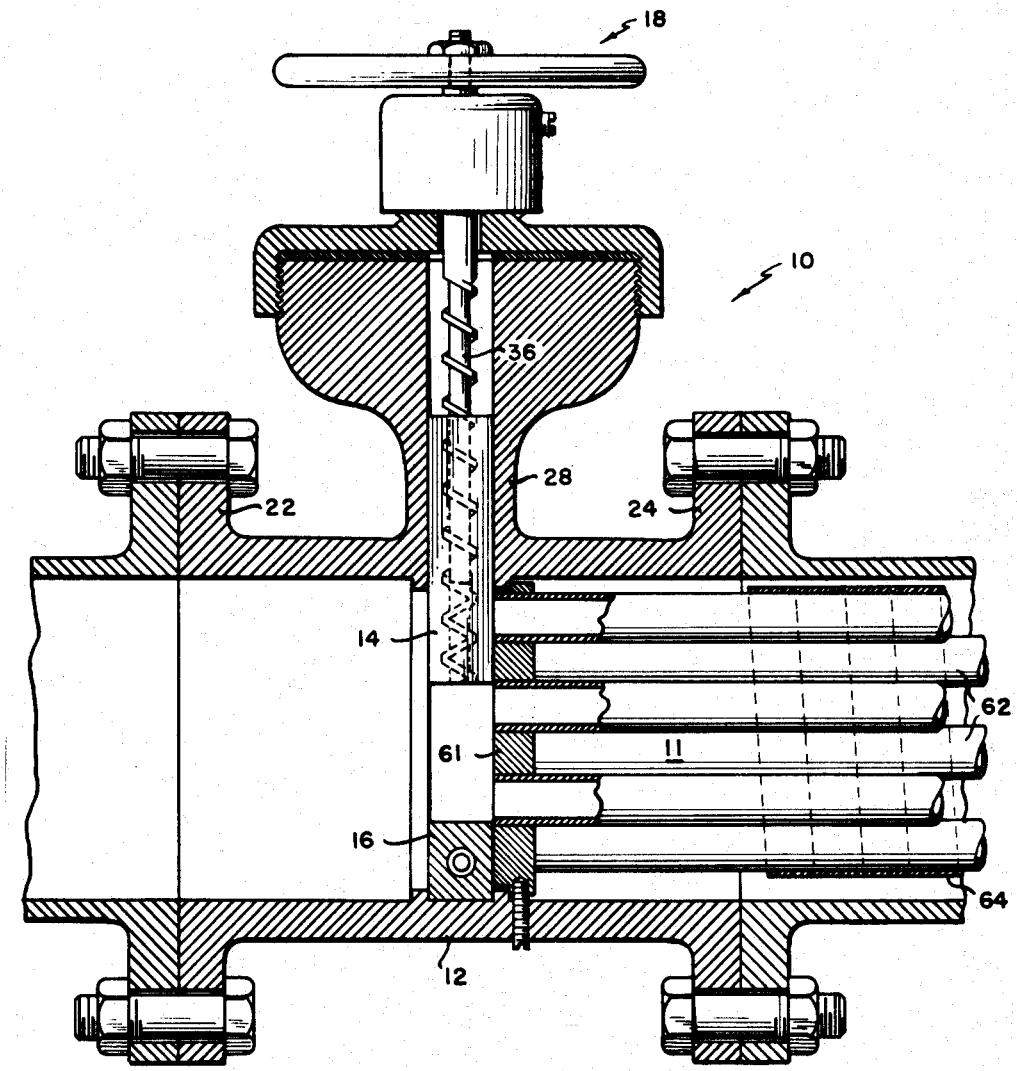
FIG. 4 is a vertical longitudinal sectional view of a portion of the regulator of FIG. 1.

Referring to FIGS. 1–4, a flow regulator or throttling means embodying the invention is shown inserted between an inflow pipe and an outflow pipe. The regulator comprises a gate valve structure including a flow-regulating gate valve indicated in its entirety by the reference numeral 10, and a flow-silencing means indicated by the reference numeral 11.

The gate valve 10 comprises a plurality of components including a valve body 12 through which a fluid, such as for example water or oil, may flow; a flow adjusting means within the body 12 in the form of a rectangular coarse-regulating gate 14 and a rectangular fine-regulating gate 16 for regulating the fluid flow; gate-control means 18 and 20 for controlling the positions of the gates 14 and 16 respectively; an upstream flange 22 at the upstream end of valve body 12 and to which a mating flange of the inlet pipe or a pipe-size adapter between the pipe and valve 10 may be secured; and in intermediate flange 24. The flange 24 is secured to a mating flange of the flow-silencing means 11 on the immediately downstream side of the gates. The flow-silencing means 11 has a downstream flange 26 to which a mating flange of the outlet pipe or of a pipe-size adapter may be secured.

The valve body 12 includes rectangular gate-receiving portions 28 and 30 for the gates 14 and 16, respectively; the rectangular portions being closed by screw-on covers 32 and 34, respectively. In the preferred embodiment, the gates 14 and 16 are flat members with broad surfaces lying in common planes, and are rectilinearly adjustably slidable in perpendicular directions in snugly fitting hollows in the gate-receiving portions 28 and 30.

The gate-control means 18 and 20 obviously may take any suitable form for controllably moving the gates 14 and 16 and preferably for predetermined distances for reasons that will be described subsequently.

In the preferred embodiment, the gate-control means 18 and 20 are substantially alike except for size, so that a description of one should suffice for the other. With reference to FIGS. 2 and 3, each gate-control means comprises an assembly of members comprising a rod 36 having a lead thread 38 for the major part of its length, a disc member 40, slidably fitted on rod 36 to abut a shoulder 41 on the rod, a handwheel 42 having an integral central positioning sleeve or tube member 44 through which a threaded outer end of rod 36 may freely pass, and a clamping nut 46 which fits the threaded end of rod 36 which projects beyond handwheel 42. When nut 46 is tightened on the threaded end of rod 36, the aforesaid members operate as a unitary spindle.

Each of gates 14 and 16 has a suitable threaded elongated hole within its body for fittingly receiving the lead thread 38 of its associated spindle, as indicated in FIG. 2. Each spindle is mounted at the outer end of its associated gate-receiving portion 28 or 30, so that the spindle can be rotated by its handwheel 42 but cannot move significantly in an axial direction. To this end each of the covers 32 and 34 has a slightly oversize central hole for its spindle and a central tubular protuberance 50 threaded on the outside to receive a nut 52. The nut 52 and protuberance 50 are formed to provide a packing or stuffing box that receives a suitable packing and the disc 40 of the spindle, and holds the disc and hence its spindle against axial displacement while the spindle is free to rotate. With the structure described, it is obvious that rotation of a spindle by its handwheel will cause the associated gate to move rectilinearly within the valve body 12.

The distance a gate will move in each single turn of its associated spindle will depend on the pitch of the thread 38. In accordance with the embodiment of the invention being described, it is desirable to have each gate adjustable to predetermined positions. To this end, each packing nut 52 is provided with a conventional positioning means comprising a ball 56 pressed by a compresison spring 58 in a hole of the nut. The ball slips into and out of an indentation or hole 59 on the outside of the sleeve 44 of the spindle. The force of spring 58 is controlled by a set screw 60 closing the hole in the nut 52. In the customary manner, an operator can readily tell when the ball is in or out of the hole 59. In any adjusted position of the gates, each ball should be in its associated hole 59.

The regulator also comprises the flow-dividing and silencing means 11 on the downstream side of the gates 14 and 16. To this end, the main portion of the valve body 12 includes a perforated partition or dividing plate 61 completely across it and immediately in the downstream side of the gates, so that a surface of the plate serves as a seat for the gates. In the embodiment being described, the perforations are arranged in orderly horizontal rows as shown in FIG. 2; and each perforation receives a tube 62 that extends for a distance downstream. The tubes 62 are parallel and preferably equal in lengths, and may be securely held or bound together by any suitable means such as, for example wrapping 64.

In the regulation of fluid flow through the valve 10, the gate 14 may be placed in any position fully closing or opening as many horizontal rows of perforations as desired by turning of handwheel 42 of gate-control 18, a single turn of handwheel moving the gate exactly the distance necessary to open or close one row. The gate 14 controls all of the rows except the end row which is at the bottom in FIG. 2. This bottom row is controlled by gate 16 through turning of handwheel 42 of its gate-control 20, in an obvious manner; each turn of handwheel 42 covering or uncovering one hole completely.

In the embodiment, it is preferred that each tube of the tubes 62 be either fully open or fully closed. Hence the relation of the pitch of the thread 38 to a turn of the spindle or handwheel should be such that one turn of the latter moves the gate exactly the right distance to fully open or fully close a single row of tubes 62 for gate 14, or a single tube for gate 16. The embodiment shown in FIGS. 1–3 has 27 tubes and obviously the gate adjustments may be such as to open almost any number of tubes from zero through 27, as desired. By providing five, instead of six, tubes in middle row A of FIG. 2, complete stepped linear flow-control is achieved when the diameters of all of the tubes 62 are the same.

To insure that the tubes are either open or closed in any adjusted position of each gate, a suitable adjustment should be made after the gate valve is initially assembled. For this adjustment, the spindles are turned until the valve is fully closed. The clamping nuts 46 of the gate-controls are loosened, and then the handwheels 42 with sleeves 44 are turned without turning rod 36. Each handwheel is turned until its ball 56 seats into its associated hole 59. The clamping nuts 46 are then securely tightened without disturbing the handwheels or the rods 36, so that each spindle assembly becomes a unit for subsequent rotation. Obviously, each gate-control may be separately adjusted and tightened.

The flow-silencing means 11 comprising tubes 62 constitutes an important feature of the invention. In a sense the tubes are paths or passages; and the number and size of the paths are chosen so that the flow velocity of the fluid stream flowing through each path is in a quiet flow region. No part of the total flow should be accelerated to a velocity large enough to cause undesirable noise. Hence in the embodiment described, it is also desirable to avoid partially open tubes or any flow through cracks; and a good seating means between the gates and the valve body, and between the gates and the closed tubes should be provided to avoid leaks that would permit leakage flow that can give rise to undesirable noises. To this end guide rails may be provided on the valve body on the upstream side of the gates.

In general, the length and cross-sectional area of each path should offer enough fluid-flow resistance so that the pressure drop from the upstream side to the downstream side of the path will not cause any part of the fluid flowing through it to produce undesirable noise. Dimensions may be obtained by trial, if desired; but the length of each passage is much greater than its inside diameter, so that each passage may be said to be elongated. It is not known at this time what the range of the ratio of length to the inside diameter should be; but in the results depicted in FIG. 5, the minimum ratio required in order to reach the ambient noise level was about 192, for that of the four foot length tubes. However, it is to be noted that improved results were obtained with the one foot and two foot length tubes having length to diameter ratios of 48 and 96, respectively. Lower ratios have also been tested and found to yield improved results.

The viscosity of the fluid has an effect on the ratio, the higher the viscosity the lower the ratio that can be used. For example, for quiet flow the ratios with oil flow may be smaller than those with water.

The regulator may be used to control flow in a vertical or horizontal direction or at any angle. The silencing, resistance-inserting passages, such as provided by tubes 62, may be provided on the upstream side of the gates or on the downstream side, or even on both sides of the gates. The elongated passages may be the same or of different lengths and they may be the same or of different cross-sections, or they may be different lengths and different cross-sections. Similarly, the valve-body, such as 12, may be generally rectangular as indicated in FIG. 2, or may be round or other shape. With careful placement of the rows of the silencing passages that divide the flow into a plurality of low velocity streams, a significant decrease in noise can be obtained.

Figure 5:
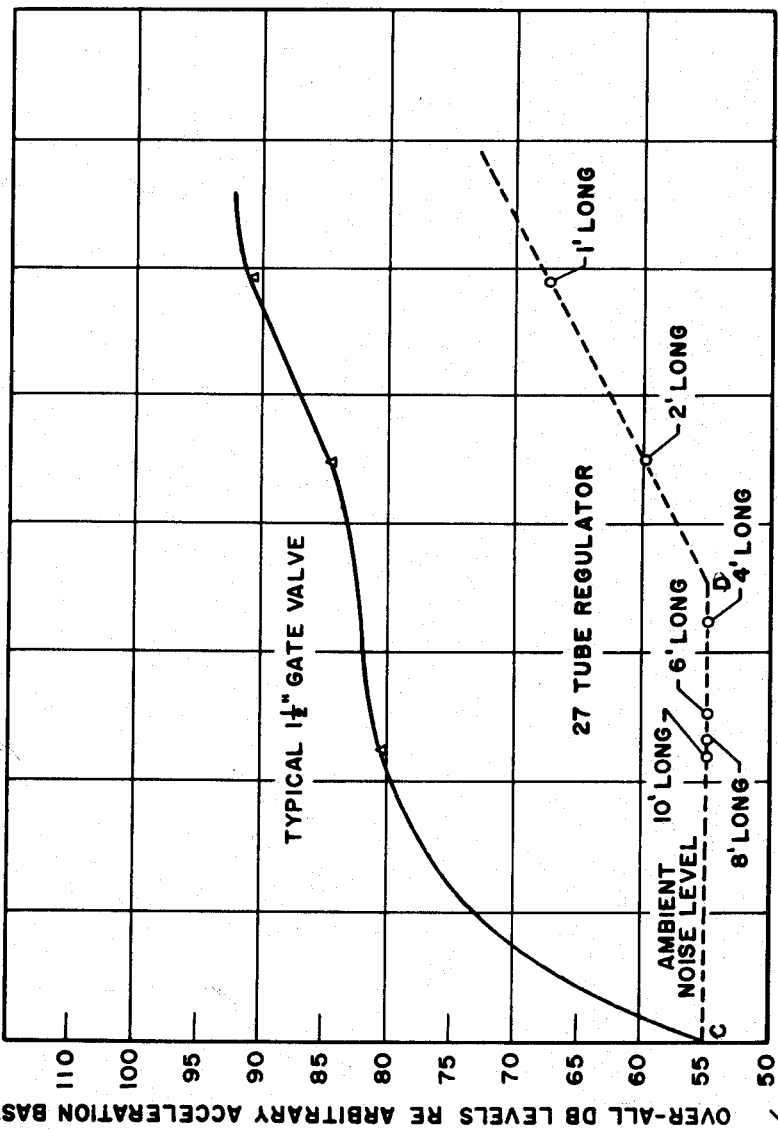
FIG. 5 is a combined graph and table for illustrating comparative noises obtained with a typical gate valve and a regulator embodying the invention.

FIG. 5 represents the silencing advantages that are obtained through the use of the device described. The data for FIG. 5 were obtained in tests with water under the same pressure drop, flow, and static pressure conditions for the various measurements. The ordinates represent overall decibel noise levels to an arbitrary acceleration base which was the same for all measurements; and the higher values represent higher noise levels. The abscissae and table represent flow rates; the lowermost numerals of the table indicating the flow of gallons per minute for adjustments of a conventional 1½″ gate valve and a similar valve with 27 juxtaposed silencing tubes having 3/16″ inside diameters.

It may be observed that for a given total flow of say 33 gallons per minute, the flow rate through each tube is only 1.22 gallons per minute at a velocity of 14.2 feet per second. In other words, each tube has such resistance that the same pressure drop which produced 33 gallons per minute through the typical gate valve per se, without the silencing means 11, produced only a flow of 1.22 gallons per minute through each tube at a velocity of 14.2 feet per second.

The noise level created by flow through a typical gate valve alone is shown by the upper curve of FIG. 5. For example, at 44 gallons per minute, the noise level was about 83 decibels at 30 inches of mercury pressure drop.

The lower curve of FIG. 5 is a composite curve in which the ambient noise level is indicated by the horizontal line CD, and was, of course, the noise level at zero flow through all of the devices tested. The circles represent the maximum noise level at the maximum flow through 27 passages of various lengths but of the same diameters. Thus, for example, with passages 2 feet long, the maximum total flow at 30 inches of mercury pressure differential was about 49.5 gallons per minute. This flow produced noise at a maximum of 60 decibels. Under the same conditions, 27 passages 1 foot long had a maximum total flow of about 65 gallons per minute at a maximum noise level of 67.5 decibels. As the tube lengths increased by increments the maximum noise levels at maximum flow for a 30" mercury pressure differential across the 27 passages decreased; and at about 4 feet lengths the flow was so quiet that the ambient noise level was reached. This indicates that for this particular set of conditions, further increases in length of the passages or tubes would not be of any benefit for noise reduction. But in all cases, a substantial noise reduction was obtained when the bare gate valve was provided with the juxtaposed silencing means.

Figure 6:
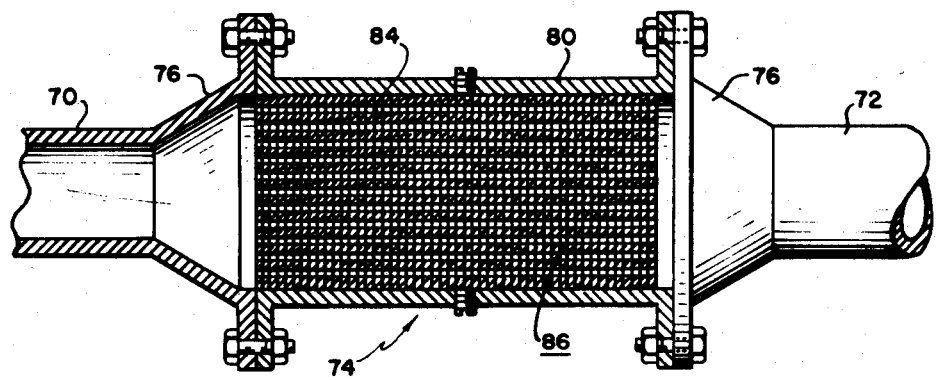
FIG. 6 is a longitudinal sectional view of another embodiment of a throttling means according to the invention.

With the gates 14 and 16 of the embodiment of FIGS. 1–4 fully open, then a structure is obtained in which the silencing means alone operates as a throttling means, with the fluid pressure on the upstream end higher than that on the downstream end. Consequently, in cases where only a fixed amount of throttling or regulation is desired, the plurality of passages alone may be used. Such an embodiment is shown in FIG. 6. In this figure an inlet pipe 70 and an outlet pipe 72 have a throttling means 74 disposed therebetween; all being circular in cross-section. Adapters 76 are used so that the total flow area through the pipes and throttling means may be the same.

The throttling means 74 comprise an outer housing-pipe 80 and a block 84 snugly received in the housing. The block 84 may be made of a plurality of laminations secured together, each lamination having a plurality of holes. The correspondingly-located holes of the laminations are on common centers, so that the assembled laminations form a plurality of paths or passages 86 corresponding in throttling operations and noise-reducing effect to that of the tubes 62 of the embodiment of FIGS. 1–4, each passage introducing a resistance to flow of fluid therethrough.

The flow resistance will be determined by the amount of pressure drop required across the throttling means; and variations in the length and inside diameter of the passages provide different pressure drops. It is believed that such a throttling means approaches a throttling process of constant enthalpy.

In the embodiment of FIGS. 1–5, the gates are adjustable by predetermined amounts, thereby setting the flow-area of the stream at that gate-point as a function of the number of tubes open; but such careful adjustments are not absolutely necessary for throttling when the paths or passages are made much more numerous as, for example, by decreasing their diameters. A regulator of this kind is shown in FIGS. 7–9.

Figure 7:
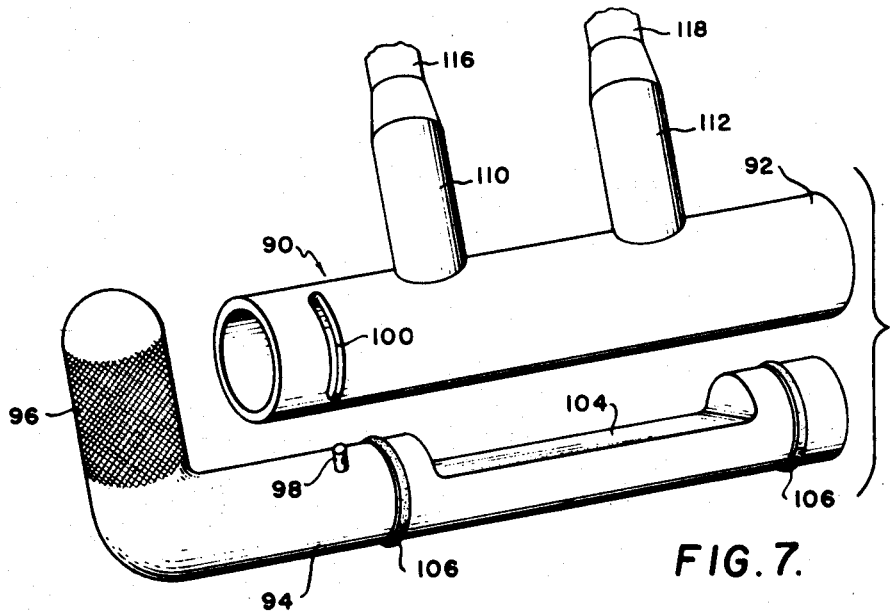
FIG. 7 is a longitudinal perspective view of still another embodiment of the invention.
Figures 8, 9:
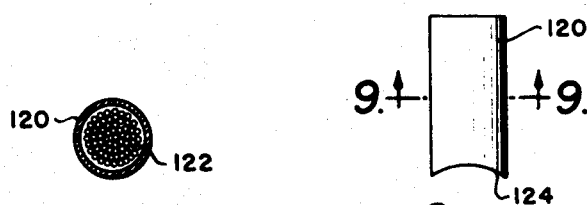
FIG. 8 is an elevational view of a silencing means used in the embodiment of FIG. 7, as viewed from an end of FIG. 7.
FIG. 9 is a cross-sectional view on the line 9—9 of FIG. 8.

The regulator embodiment of FIGS. 7–9 shows a block of silent throttling passages on both sides of a valve of the rotary-type. It also differs from the embodiment of FIGS. 1–4 in that the passages are much smaller in diameter and larger in number. By this expedient, the valve can be smoothly adjusted to any flow-controlling position within the range of the valve.

The valve 90 of FIGS. 7 and 8 comprises an outer relatively fixed, circular hollow main housing-pipe 92 within which is snugly seated or fitted a circular rotary valve rod 94. The ends of the housing-pipe 92 are open and rod 94 projects therethrough, the projection including a stem or handle 96 for turning the rod to any position between limits determined by a pin 98 secured in rod 94 and ridable in a circumferential slot 100 in housing pipe 92.

The rod 94 also has a longitudinal flow passage 104 milled or otherwise machined in a side thereof, and a pair of flow-stopping seals or O-rings 106 outwardly of the ends of the passage.

A side of the main housing-pipe 92 is provided with a pair of longitudinally aligned slots or holes which receive a silencing means 110 and a silencing means 112, respectively, the slots being interconnectible for fluid flow therebetween by the passage 104. The silencing means 110 is connected to fluid inlet pipe 116; and the silencing means 112 is connected to an outlet pipe 118. In closed position of the regulator of FIGS. 7–9, the passage 104 is completely out-of-register with the slots in the main housing 92 and hence with the corresponding open end of the silencing means 110 and 112. As the rod 94 is turned by handle 96, the passage 104 can be brought into as much register with the silencing means as desired, permitting adjustable control of the quantity of fluid flowing from inlet pipe 116, through the silencing means 110, through passage 104, through silencing means 112, and then out through outlet pipe 118.

In the embodiment of FIGS. 7–9, the silencing means 110 and 112 are alike; and each comprises an outer housing 120 in which is cemented a plurality of parallel tubes 122 filling the housing. The interstices between tubes may be filled with any suitable material. The end of housing 120 and the tubes 122 at the side of main housing 92 are cut or machined in any suitable manner to mate the rod 94, and such a curved end is indicated at 124 in FIG. 8.

In a specific embodiment of a silencing means in a structure as shown in FIGS. 7–9, each of two 2½ inch diameter housings was provided with 199 tubes of ⁹⁄₆₄" inside diameter and 5 inches long yielding a total length to diameter ratio of 213⅓. In contrast to the embodiment of FIGS. 1–4, there was no need for insuring that none of the tube-passages of the embodiment of FIGS. 7–9 were partially open or closed for quietly controlling a hydraulic oil flow therethrough with a pressure differential of about 1500 pounds per square inch between the upstream and downstream sides of the regulator, the latter side being at about 500 pounds per square inch.

Obviously many modifications and variations of the present invention are possible in the light of the above teachings. It is therefore to be understood that within the scope of the appended claims the invention may be practiced otherwise than as specifically described.

What is claimed is:
1. A fluid flow system comprising:
   a pipe;
   a gate valve in said pipe for metering the flow of a fluid passed through said pipe and including
   a coarse-regulating gate,
   a fine regulating gate, and
   control means on each of said gates for selectively moving said gates as a stepped linear flow controller to any one of a plurality of positions including a closed position where no fluid is permitted to flow in said pipe, and a fully open position whereby maximum flow is permitted; and
   a plurality of open tubes longitudinally disposed in said pipe and having ends thereof contacting said valve to be opened and closed by the same in one plane whereby a pressure differential across said valve, caused by a fluid passing thereacross, may be substantially entirely absorbed by said tubes, thereby decreasing the turbulence and noise generated by the fluid passing through the pipe.

2. A fluid flow system according to claim 1, wherein said control means includes indicating means for indicating when the position of the gate is such each of said tubes is either fully opened or fully closed.

3. A liquid flow system comprising:
a pipe;
a gate valve in said pipe for metering the flow of a liquid passed through said pipe and including
a coarse regulating gate in one plane;
a fine regulating gate in said one plane; and
control means on each of said gates for selectively moving said gates as a stepped linear flow controller to any one of a plurality of positions including a closed position where no liquid is permitted to flow in said pipe, and a fully opened position whereby maximum flow is permitted; and
a plurality of open tubes having a minimum ratio of length of tubing to inside diameter of tubing of approximately forty-eight per foot of tubing, said tubes being longitudinally disposed in said pipe and having ends thereof in said one plane contacting said valve to be opened and closed by the same, whereby a pressure differential across said valve, caused by a liquid passing thereacross, may be substantially entirely absorbed by said tubes, thereby decreasing the turbulence and noise generated by the liquid passing through the pipe.

References Cited by the Examiner

UNITED STATES PATENTS

| | | | |
|---|---|---|---|
| 2,341,940 | 2/44 | Millington | 138—553 XR |
| 2,697,446 | 12/54 | Harrington | 251—118 XR |
| 2,768,604 | 10/56 | Enerud | 137—553 XR |
| 2,908,290 | 10/59 | Hamilton-Peters | 251—118 XR |
| 3,033,306 | 5/62 | Hallene | 181—46 |
| 3,042,078 | 7/62 | Rosell | 137—625.3 |
| 3,103,941 | 9/63 | Watters | 137—1 |

FOREIGN PATENTS

| | | |
|---|---|---|
| 86,514 | 6/36 | Sweden. |

WILLIAM F. O'DEA, *Primary Examiner.*